(12) United States Patent
Lichtinger et al.

(10) Patent No.: US 7,584,667 B2
(45) Date of Patent: *Sep. 8, 2009

(54) METHOD AND APPARATUS FOR SENSING SEAT OCCUPANT WEIGHT

(75) Inventors: Harald Lichtinger, Auburn Hills, MI (US); Ralf Oestreicher, Kandel (DE); Josef Dirmeyer, Bodenwöhr (DE)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 779 days.

This patent is subject to a terminal disclaimer.

(21) Appl. No.: 11/175,514

(22) Filed: Jul. 6, 2005

(65) Prior Publication Data
US 2005/0241872 A1 Nov. 3, 2005

Related U.S. Application Data

(63) Continuation of application No. 09/507,868, filed on Feb. 22, 2000, now Pat. No. 6,988,413.

(60) Provisional application No. 60/120,637, filed on Feb. 24, 1999.

(51) Int. Cl.
*G01L 1/00* (2006.01)
(52) U.S. Cl. .................... 73/768; 73/862.391; 280/735; 340/667; 701/45
(58) Field of Classification Search .................. None
See application file for complete search history.

(56) References Cited

U.S. PATENT DOCUMENTS

| | | | |
|---|---|---|---|
| 3,766,344 A | 10/1973 | Nevett | |
| 5,232,243 A | 8/1993 | Blackburn | |
| 5,413,378 A | 5/1995 | Steffens | |
| 5,618,056 A | 4/1997 | Schoos | |
| 5,626,359 A | 5/1997 | Steffens | |
| 5,670,853 A | 9/1997 | Bauer | |
| 5,810,392 A | 9/1998 | Gagnon | |
| 5,942,695 A * | 8/1999 | Verma et al. | 73/768 |
| 5,971,432 A | 10/1999 | Gagnon | |

(Continued)

FOREIGN PATENT DOCUMENTS

DE 38 09 074 C2 10/1989

(Continued)

OTHER PUBLICATIONS

Research Disclosure, Jul. 1997, No. 399.

*Primary Examiner*—Eric S McCall

(57) ABSTRACT

A system for measuring the weight of a seat occupant is used to control airbag deployment. The system is incorporated into a vehicle seat supported on inboard and outboard track assemblies. The inboard and outboard track assemblies are mounted to a vehicle structure such that a center track portion remains unsupported. A first sensor assembly is mounted to the inboard track assembly and a second sensor assembly is mounted to the outboard track assembly. The first sensor assembly generates a first signal in response to measuring deflection of the inboard track assembly due to seat occupant weight. The second sensor assembly generates a second signal in response to measuring deflection of the outboard track assembly due to seat occupant weight. A central processor determines seat occupant weight based on the first and second signals. The central processor communicates with the airbag system to control the deployment of the airbag based on seat occupant weight.

20 Claims, 3 Drawing Sheets

U.S. PATENT DOCUMENTS

| | | |
|---|---|---|
| 6,039,344 A | 3/2000 | Mehney |
| 6,069,325 A | 5/2000 | Aoki |
| 6,070,115 A | 5/2000 | Oestreicher |
| 6,092,838 A | 7/2000 | Walker |
| 6,113,139 A * | 9/2000 | Heximer et al. ............ 280/735 |
| 6,201,480 B1 * | 3/2001 | Aoki ......................... 340/667 |
| 6,231,076 B1 * | 5/2001 | Blakesley et al. .......... 280/735 |
| 6,293,585 B1 | 9/2001 | Bruns |
| 6,356,200 B1 * | 3/2002 | Hamada et al. ............. 340/667 |
| 6,407,347 B1 * | 6/2002 | Blakesley .................. 177/144 |
| 6,428,039 B1 * | 8/2002 | Pramler ..................... 280/735 |
| 6,520,023 B2 * | 2/2003 | Kimura ...................... 73/795 |

FOREIGN PATENT DOCUMENTS

| | | | |
|---|---|---|---|
| DE | 197 52 356 | A1 | 5/1999 |
| DE | 199 31 379 | A1 | 1/2001 |
| EP | 0 962 362 | A2 | 12/1999 |
| EP | 0 990 565 | A1 | 4/2000 |
| JP | 9-150662 | | 3/1997 |
| JP | 11-304579 | * | 11/1999 |
| WO | WO 9822920 | | 5/1998 |

* cited by examiner

_US 7,584,667 B2_

METHOD AND APPARATUS FOR SENSING SEAT OCCUPANT WEIGHT

RELATED APPLICATION

This application is a continuation of U.S. Ser. No. 09/507,868 filed Feb. 22, 2000, which claims priority to U.S. Provisional Application No. 60/120,637 filed on Feb. 24, 1999.

BACKGROUND OF THE INVENTION

1. Field of the Invention

This invention relates to a method and apparatus for measuring the weight of a seat occupant. Specifically, a sensor arrangement is mounted within a vehicle seat track to provide accurate seat occupant weight measurements.

2. Related Art

Most vehicles include airbags and seatbelt restraint systems that work together to protect the driver and passengers from experiencing serious injuries due to a high speed collision. It is important to control the deployment force of the airbags and the force of the seatbelt pretensioners based on the size of the driver or the passenger. One way to control these forces is to monitor the weight of the seat occupant. If a smaller person such as a child or infant in a car seat is in the passenger seat, the weight on the seat will be less than if an adult occupies the seat.

Current systems for measuring the weight of a seat occupant are complex and expensive. One type of system uses pressure sensitive foil mats mounted within the seat bottom foam. Another system uses sensors placed at a plurality of locations within the seat bottom. The combined output from the mats or the sensors is used to determine the weight of the seat occupant. These sensors experience a substantially vertical force, due to the weight of the seat occupant, but are also subject to longitudinal and lateral forces caused by acceleration, deceleration, or turning. The lateral and longitudinal forces picked up by the sensor incorporate an error component into the weight measurement. The sensors are very sophisticated using multiple strain gages and complicated bending elements to provide high measurement sensitivity in the vertical direction and low sensitivity to lateral and longitudinal forces in order to increase accuracy.

Mounting these sensors within the seat bottom can also be difficult and time consuming. It is difficult to find mounting locations for each the sensors that will accommodate all of the various positions of a seated occupant while still providing accurate measurements. Further, shifting of the occupant on the seat can dislodge or move the sensors out of their proper location. Because the sensors are mounted within the seat bottom, it is difficult to reposition the sensors after the seat is installed in the vehicle.

Thus, it is desirable to have a simplified seat occupant weight measurement system that is accurate and easily to install and overcomes the above references deficiencies with prior art systems.

SUMMARY OF THE INVENTION

In a disclosed embodiment of this invention, a system for measuring the weight of an occupant seated on a vehicle seat includes a track assembly that is used to support a vehicle seat. The track assembly includes a first track mounted to a vehicle structure and a second track supported for movement relative to the first track. The tracks are deflectable in a vertical direction due to an occupant weight force exerted on the seat. At least one sensor is mounted on the tracks for generating a signal representative of the occupant weight force.

In a preferred embodiment, the track assembly is comprised of an inboard track assembly and an outboard track assembly spaced apart from the inboard track assembly. A first sensor assembly is mounted to the inboard track assembly for generating a first signal in response to measuring deflection of the inboard track assembly due to seat occupant weight. A second sensor assembly is mounted to the outboard track assembly for generating a second signal in response to measuring deflection of the outboard track assembly due to seat occupant weight. The system uses a central processor to determine seat occupant weight based on the first and second signals. The system also preferably includes an airbag control module that is in communication with the processor. Deployment force of an airbag is controlled by the control module based on seat occupant weight.

A method for determining the weight of a seat occupant includes the following steps. An inboard seat track assembly is mounted to a vehicle structure and an outboard seat track assembly is spaced apart from the inboard seat track assembly and mounted to the vehicle structure. The inboard and outboard seat track assemblies are defined by a predetermined cross-sectional area and each track assembly has at least one track segment with a cross-sectional area that is less than the predetermined cross-sectional area. The method steps includes mounting a first sensor assembly in the track segment of the inboard seat track assembly, mounting a second sensor assembly in the track segment of the outboard seat track assembly, generating a first signal from the first sensor assembly in response to deflection of the inboard track assembly due to seat occupant weight, generating a second signal from the second sensor assembly in response to deflection of the outboard track assembly due to seat occupant weight, and combining the first and second signals to determine seat occupant weight.

Additional steps include providing a system controller for controlling deployment of an airbag and generating a seat occupant weight signal based on the combination of the first and second signal. The seat occupant weight signal is transmitted to the controller and the deployment force of the airbag is controlled based on the seat occupant weight.

These and other features of the present invention can be best understood from the following specification and drawings, the following of which is a brief description.

DETAILED DESCRIPTION OF AN EXEMPLARY EMBODIMENT

Figure 1:
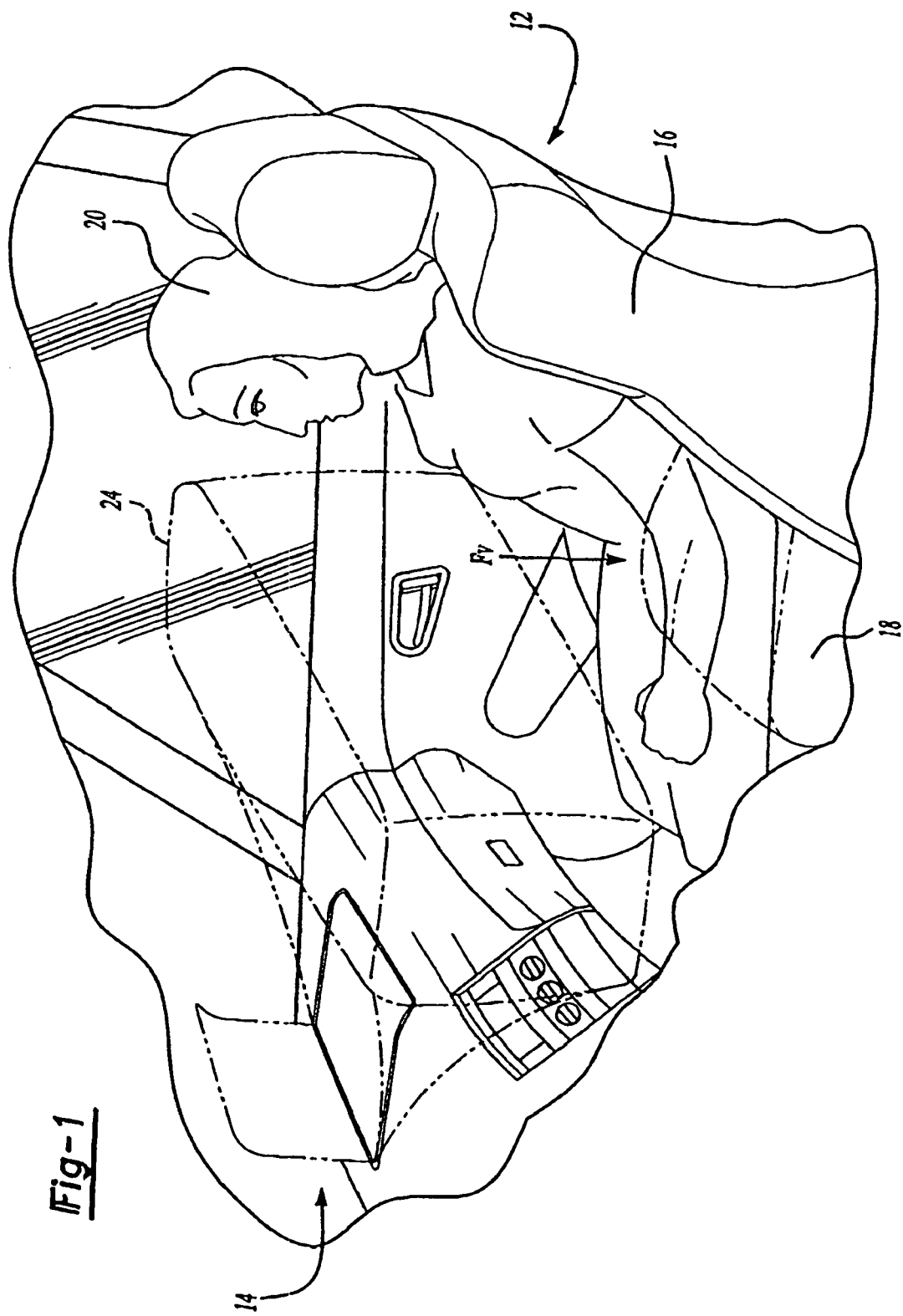
FIG. 1 is a perspective view showing a vehicle with an airbag system and an occupant sitting in a seat with the airbag in an active state shown in dashed lines.

A vehicle includes a vehicle seat assembly, shown generally at 12 in FIG. 1, and an airbag system 14. The seat assembly 12 can be either a driver or passenger seat and includes a seat back 16 and a seat bottom 18. When a vehicle occupant 20 is seated on the seat 12 a vertical force Fv is exerted against the seat bottom 18. The vertical force Fv represents the weight of the seat occupant 20.

Figure 2:
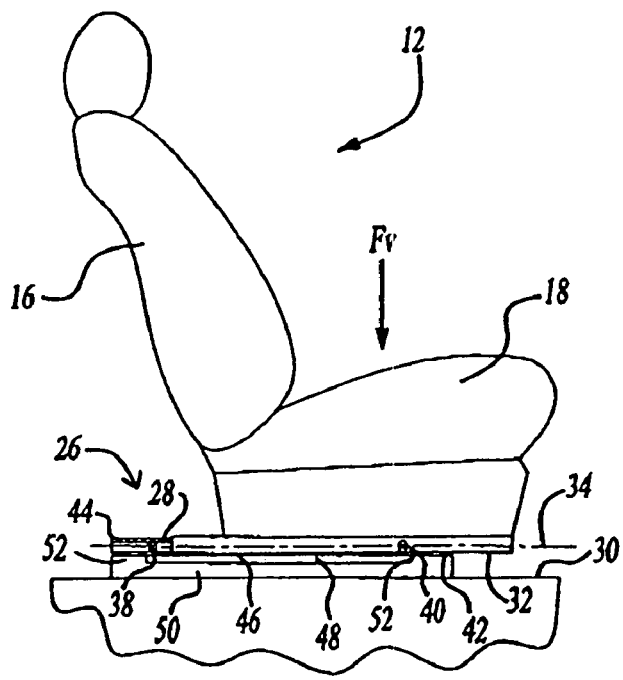
FIG. 2 is a side view of a seat assembly incorporating the subject weight measurement system.

The airbag system 14 deploys an airbag 24 under certain collision conditions. The deployment force for the airbag 24, shown in dashed lines in FIG. 1, varies according to the weight of the occupant 20. The vehicle includes a unique system for measuring the weight of the seat occupant 20. This unique system is installed within a seat track assembly, generally indicated at 26 in FIG. 2.

The seat track assembly 26 includes a first track member 28 mounted to a vehicle structure 30 such as a floor, frame, or riser, for example. A second track member 32 is supported for movement relative to the first track member 28 along a longitudinal axis 34. First 38 and second sensors 40 are mounted on one of the track members 28, 32. The sensors 38 and 40 are used to generate a signal representative of the occupant weight. The first sensor 38 is preferably positioned rearwardly and the second sensor 40 positioned forwardly on the track assembly 26. The first 38 and second 40 sensors are used to measure deflection of the track assembly 26 to generate the signal.

The first track member 28 includes a forward end 42 and a rearward end 44 with a central track portion 46 extending between the ends 42, 44. The forward 42 and rearward 44 ends are mounted to the vehicle structure 30 such that the central track portion 46 remains unsupported to form gap 48 between the vehicle structure 30 and the central track portion 46. Preferably, the first track member 28 is mounted to a riser 50 having upwardly extending supports 52 at each end for attachment to the forward 42 and rearward 44 ends of the first track member 28.

Figure 3:
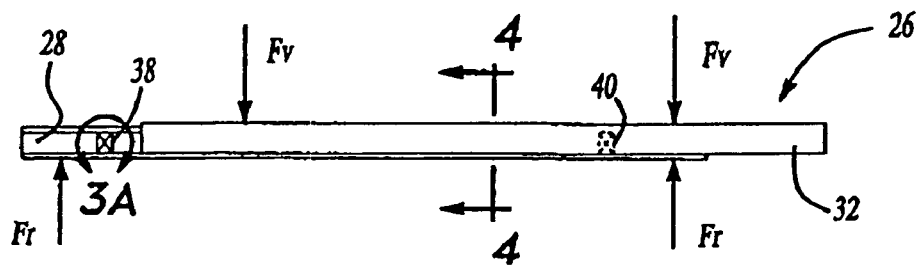
FIG. 3 is a side view of the seat track assembly of FIG. 2.
Figure 3A:
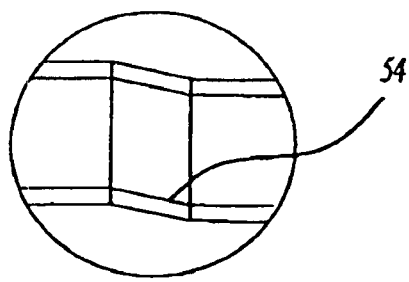
FIG. 3A is a magnified view of the section 3A indicated in FIG. 3.

Thus, the central track portion 46 of the seat track assembly 26 is deflectable under load. When the occupant is seated on the seat 12, a vertical force Fv is exerted against the track assembly 26, as shown in FIG. 3. Reaction forces Fr are exerted in the opposite direction. The forces cause the central track portion 46 to deflect and reflect full bending beam behavior, shown generally at 54 in FIG. 3A. The sensors are preferably strain gages 38, 40 that are positioned along the central track portion 46, however, other types of sensors known in the art could also be used. For example, fiber optic or magneto elastic sensors could be used.

Figure 4:
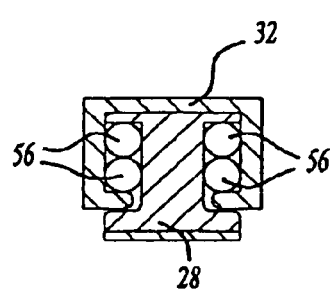
FIG. 4 is a cross sectional view of the track assembly taken along lines 4-4 of FIG. 3.

The sensors 38, 40 are preferably positioned in the first track member 28 such that the sensors 38, 40 remain positioned in the unsupported track section as the second track member 32 adjusts horizontally along axis 34. As shown in FIG. 4, a plurality of ball bearings 56 are installed between the track members 28, 32 such that the second track member 32 can slide easily relative to the first track member 28. The bearings 56 also transfer the forces applied to the second track member 32 to the rigid central track portion 46 between the two (2) sensor locations.

Figure 5:
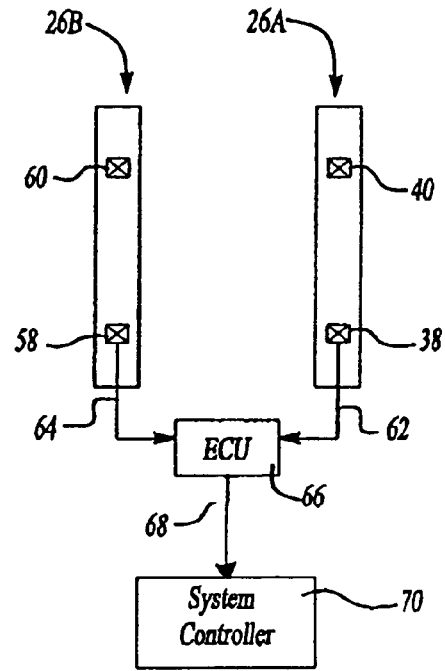
FIG. 5 is a schematic view of a control system for the subject weight measurement system.

As shown in FIG. 5, the seat 12 is mounted to the vehicle structure 30 on an inboard track assembly 26a and an outboard track assembly 26b that is spaced apart from the inboard track assembly 26a by a predetermined distance. The inboard 26a and outboard 26b track assemblies are mounted to have similar bending behavior, i.e. both track assemblies 26a, 26b are deflectable in a vertical direction due to an occupant weight force. Both the inboard 26a and outboard 26b track assemblies include first 28 and second 32 track members.

In one embodiment, first 38 and second 40 sensors are installed in the inboard track assembly 26a and third 58 and fourth 60 sensors are installed in the outboard track assembly 26b. The first 38 and second 40 sensors generate a first signal 62 representative of the portion of occupant weight on the inboard track assembly 26a and the third 58 and fourth 60 sensors generate a second signal 64 representative of the portion of occupant weight on the outboard track assembly 26b. The signals 62, 64 are transmitted to an electronic control unit (ECU) 66, which combines the signals to determine the weight of the occupant 20. The ECU then sends a control signal 68 to a system controller 70. Preferably, the system controller 70 is an airbag control module that is in communication with the ECU 66 such that the deployment force of the airbag 24 is controlled based on seat occupant weight. The system controller 70 could also be used to control the force of seat belt pretensioners based on occupant weight.

While the above configuration is preferred, an option configuration could utilize one sensor assembly mounted to the inboard track assembly for generating the first signal 62 in response to measuring deflection of the inboard track assembly 26a due to seat occupant weight and a second sensor assembly mounted to the outboard track assembly 26b for generating the second 64 signal in response to measuring deflection of the outboard track assembly 26b due to seat occupant weight.

Figure 7:
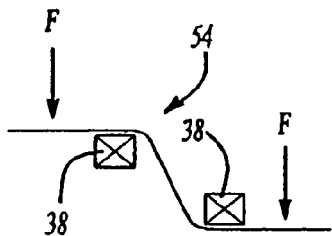
FIG. 7 is a schematic view representing a full bending bridge.
Figure 6:
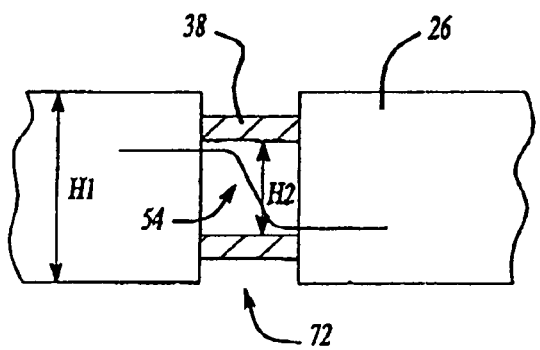
FIG. 6 is a schematic view of the sensors mounted within the subject track assembly.

As shown in greater detail in FIG. 6, the track assembly 26 has a predetermined cross-sectional area defined by height H1. A track portion, generally indicated at 72, of each track assembly 26 has a cross-sectional area defined by H2 that is less than the predetermined cross-sectional area H1. Each track assembly 26a, 26b has two (2) track portions 72 with this decreased cross-sectional area. One sensor assembly 38, 40, 58, 60 is mounted in each track portion 72. Only the first sensor assembly 38 is shown in FIG. 6. As the track assembly 26 deflects under load, the sensor assembly 38 measures full bending beam behavior 54, shown in FIG. 7. Each of the sensors 38, 40, 58, 60 at the four (4) locations thus serves as a Wheatstone Bridge for measuring deflection. The operation of a Wheatstone Bridge is well known in the art.

Preferably, the reduced cross-sectional area track portions 72 are created by forming square shaped holes within the first track member 28. The holes create dual-beam spring elements. With such elements located on the inboard 26a and outboard 26b track assemblies, it is possible to measure the vertical force Fv applied on the area between the two sets of tracks 26a, 26b.

The method for determining the weight of a seat occupant includes the following steps. An inboard seat track assembly 26a is mounted to a vehicle structure 30 and an outboard seat track assembly 26b is spaced apart from the inboard seat track assembly 26a and mounted to the vehicle structure 30. The inboard 26a and outboard 26b seat track assemblies are defined by a predetermined cross-sectional area H1 and each track assembly 26a, 26b has at least one track portion 72 with a cross-sectional area H2 that is less than the predetermined cross-sectional area H1. The method steps include mounting a first sensor assembly in the track portion 72 of the inboard seat track assembly 26a and mounting a second sensor assembly in the track portion 72 of the outboard seat track assembly 26b. A first signal 62 is generated from the first sensor assembly in response to deflection of the inboard track assembly 26a due to seat occupant weight. A second signal 64 is generated from the second sensor assembly in response to deflection of the outboard track assembly 26b due to seat occupant weight. The first 62 and second 64 signals are used to determine seat occupant weight.

Additional steps include providing a system controller 70 for controlling deployment of an airbag 24 and generating a seat occupant weight signal based on the combination of the first 62 and second 64 signals. The seat occupant weight signal is transmitted to the controller and the deployment force of the airbag is controlled based on the seat occupant weight.

Other steps include providing the inboard 26a and outboard 26b track assemblies with forward ends 42 and rearward 44 ends interconnected by the central track portion 46 and fixing the forward 42 and rearward 44 ends to the vehicle structure 30 such that the central track portion 46 of each track assembly 26a, 26b remains unsupported. The track portion 72 is preferably located in the central track portion 46.

As discussed above, the first sensor assembly is preferably comprised of first 38 and second 40 sensors that are mounted in the first track member 28 of the inboard track assembly 26a. The second sensor assembly is preferably comprised of third 58 and fourth 60 sensors that are mounted in the first track member 28 of the outboard track assembly 26b.

A seat track assembly 26 with integrated weight sensors 38, 40, 58, 60 is provided to determine the weight of an occupant 20 seated on a vehicle seat 12. It is preferable to integrate the sensors 38, 40, 58, 60 into the seat track assembly 26 because it is a common component for most vehicle seats 12. The subject weight measurement system is easily incorporated into any type of seat track configuration. The weight sensors 38, 40, 58, 60 are mounted within reduced size track portions 72 to measure deflection of the track material caused by the weight of the occupant 20. The measured weight is independent of seat positions and is accurately provided in various occupant positions on the seat 12.

By measuring the deflection in all four (4) locations in the inboard 26a and outboard 26b track assemblies, it is possible to calculate the occupant weight, which is proportional to the sum of the output of all of the sensors 38, 40, 58, 60. The center of gravity of the upper part of the seat and the occupant can be calculated by subtracting the sum of the sensor signals in the front from the sum of the sensor signals in the rear and dividing the result by the sum of all four (4) signals. The electronics for signal conditioning can be housed within the track assemblies 26a, 26b as is well known in the art.

Figure 8:
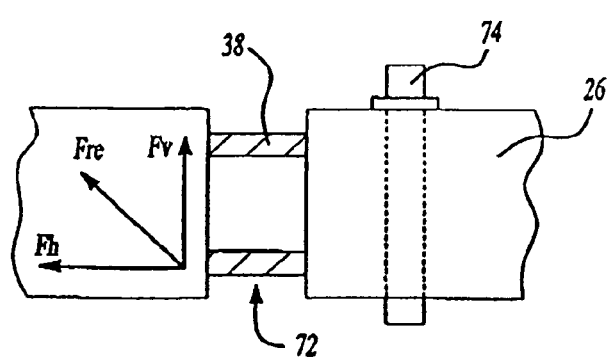
FIG. 8 is a schematic view of the sensors mounted within the subject track assembly having an overload mechanism.

Under high overload conditions, the track assembly 26 experiences high vertical Fv and horizontal Fh forces. These forces cause the track to experience an overload resultant force Fre that will try to separate the track 26 from the floor 30. In applications, with heavy overload conditions, like seats having integrated or all-belts-to seat configurations, it is beneficial to integrate an active overload protection. One such method of protection utilizes an overload bolt 74, shown in FIG. 8, extending through the track members 28, 32 to the vehicle floor 30. Under high vehicle impact forces, the bolt 74 prevents the track assembly 26 from separating from the floor 30. Thus, the reduced cross-sectional areas of track portion 72 do not have to sustain the full impact forces.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A system for measuring weight of an occupant seated on a vehicle seat comprising:

a first track mountable to a vehicle structure;

a second track supported for movement relative to said first track for adjustment along a longitudinal axis and being deflectable in a vertical direction due to an occupant weight force generated by the occupant sitting on the vehicle seat;

at least one sensor mounted to said first track for generating a signal representative of said occupant weight force; and a central processor for receiving said signal.

2. A system according to claim 1 including an airbag control module in communication with said central processor wherein deployment force of an airbag is controlled by said airbag control module based on seat occupant weight.

3. A system according to claim 2 wherein said first track includes a forward end and a rearward end with a central track portion extending between said forward and rearward ends, said forward and rearward ends being mounted to the vehicle structure such that said central track portion remains unsupported to form a gap between the vehicle structure and the central track portion.

4. A system according to claim 3 wherein said at least one sensor is positioned along said central track portion.

5. A system according to claim 4 wherein said at least one sensor is comprised of a first sensor positioned forwardly on said central track portion and a second sensor positioned rearwardly on said central track portion, said first and second sensors for measuring deflection of said second track to generate said signal.

6. A system according to claim 5 including a third track mounted to the vehicle structure, a fourth track supported for movement relative to said third track for adjustment along a longitudinal axis and being deflectable in a vertical direction due to said occupant weight force generated by the occupant sitting on the vehicle seat, and a third sensor mounted on one of said third or fourth tracks working with said first and second sensors to generate said signal, said first and second tracks forming an inboard track assembly and said third and fourth tracks forming an outboard track assembly.

7. A system for measuring seat occupant weight comprising:

a first seat track adapted to be fixed to a vehicle structure;

a second seat track supported for movement relative to said first seat track for adjustment along a longitudinal axis, said first and second seat tracks being deflectable in a direction transverse to said longitudinal axis due to an occupant weight force generated by an occupant sitting on a vehicle seat; and at least one sensor mounted directly to said first seat track to generate a weight signal by measuring deflection of said first and second seat tracks due to seat occupant weight.

8. A system according to claim 7 wherein said first seat track includes a forward end and a rearward end with a central portion extending between said forward and rearward ends, said forward and rearward ends being mountable to the vehicle structure such that said central portion remains unsupported to form a gap between the vehicle structure and said central portion.

9. A system according to claim 7 wherein said first track and said second track form an inboard track assembly and wherein said at least one sensor comprises a first sensor assembly mounted to said inboard track assembly for generating a first signal in response to measuring deflection of said inboard track assembly and a second sensor assembly mounted to an outboard track assembly spaced apart from said inboard track assembly, said second sensor assembly for generating a second signal in response to measuring deflection of said outboard track assembly and including a central processor for determining seat occupant weight based on said first and second signals.

10. A system according to claim 9 wherein said outboard track assembly comprises a third track mountable to the vehicle structure and a fourth track mounted for movement relative to said second track and wherein said first sensor assembly is mounted to said first track and said second sensor assembly is mounted to said third track.

11. A system for measuring weight of an occupant seated on a vehicle seat comprising:
a first track mountable to a vehicle structure;
a second track supported for movement relative to said first track for adjustment along a longitudinal axis and being deflectable in a direction transverse to said longitudinal axis due to an occupant weight force exerted on the vehicle seat;
at least one sensor mounted on one of said first and second tracks for generating a signal representative of said occupant weight force wherein said first track and said second track form an inboard track assembly and wherein said at least one sensor comprises a first sensor assembly mounted to said inboard track assembly for generating a first signal in response to measuring deflection of said inboard track assembly and a second sensor assembly mounted to an outboard track assembly spaced apart from said inboard track assembly, said second sensor assembly for generating a second signal in response to measuring deflection of said outboard track assembly wherein said inboard and outboard track assemblies have a predetermined cross-sectional area with each track assembly having at least one track portion having a cross-sectional area that is less than said predetermined cross-sectional area, said first and second sensor assemblies being mounted on said track portion; and
a central processor for determining seat occupant weight based on said first and second signals.

12. A system according to claim 11 wherein said inboard and outboard track assemblies each include a forward end and a rearward end with a central portion extending between said forward and rearward ends, said forward and rearward ends being mounted to the vehicle structure such that said central portions are unsupported forming a gap between the vehicle structure and the inboard and outboard track assemblies.

13. A system according to claim 12 wherein said at least one track portion, with said cross-sectional area that is less than said predetermined cross-sectional area, is located in said central portion.

14. A system according to claim 12 wherein said at least one track portion of each of said inboard and outboard track assemblies is comprised of a first track portion located forwardly in said central portion and a second track portion located rearwardly in said central portion and wherein said first and second sensor assemblies each include a first sensor mounted on said first track portion and a second sensor mounted on said second track portion.

15. A system according to claim 12 including an airbag control module in communication with said central processor wherein deployment force of an airbag is controlled by said airbag control module based on seat occupant weight.

16. A method for determining weight of a seat occupant comprising the steps of:
providing a first track adapted for mounting to a vehicle structure and a second track supported for movement relative to the first track along an axis to form a first track assembly;
providing a second track assembly spaced apart from the first track assembly with the second track assembly including a third track adapted for mounting to the vehicle structure and a fourth track supported for movement relative to the third track along an axis and wherein the first and second track assemblies are defined by a predetermined cross-sectional area and each track assembly has at least one track segment with a cross-sectional area that is less than the predetermined cross-sectional area;
mounting a first sensor assembly to the first track assembly by mounting the first sensor assembly to the first track in the track segment of the first track assembly;
mounting a second sensor assembly to the second track assembly by mounting the second sensor assembly to the third track in the track segment of the second track assembly;
generating a first signal from the first sensor assembly in response to deflection of the first track assembly in a direction transverse to the axis due to seat occupant weight generated by the occupant sitting on the vehicle seat;
generating a second signal from the second sensor assembly in response to deflection of the second track assembly in a direction transverse to the axis due to seat occupant weight generated by the occupant sitting on the vehicle seat; and
combining the first and second signals to determine seat occupant weight.

17. A method according to claim 16 including the step of providing a system controller for controlling deployment of an airbag; generating a seat occupant weight signal based on the combination of the first and second signals; transmitting the seat occupant weight signal to the controller; and controlling a deployment force of the airbag based on the seat occupant weight.

18. A method according to claim 16 including the steps of providing the first and second track assemblies with forward ends and rearward ends interconnected by a center portion and fixing the forward and rearward ends to the vehicle structure such that the center portion of each track assembly remains unsupported.

19. A method according to claim 18 including the step of locating the track segment in the center portion.

20. A method according to claim 16 wherein the first sensor assembly is comprised of a first sensor mounted rearwardly within the first track assembly and a second sensor mounted forwardly within the first track assembly and wherein the second sensor assembly is comprised of a third sensor mounted rearwardly within the second track assembly and a fourth sensor mounted forwardly within the second track assembly.

* * * * *